United States Patent [19]
Nelson et al.

[11] Patent Number: 5,568,641
[45] Date of Patent: Oct. 22, 1996

[54] POWERFAIL DURABLE FLASH EEPROM UPGRADE

[75] Inventors: Marvin D. Nelson; Barry J. Oldfield; Mark D. Petersen, all of Boise, Id.

[73] Assignee: Hewlett-Packard Company, Palo Alto, Calif.

[21] Appl. No.: 375,095

[22] Filed: Jan. 18, 1995

[51] Int. Cl.[6] .................................................. G06F 9/00
[52] U.S. Cl. .................. 395/700; 395/750; 364/DIG. 1; 364/280; 364/280.2; 364/273.4
[58] Field of Search .......................... 395/700, 650, 395/750

[56] References Cited

U.S. PATENT DOCUMENTS

| | | | |
|---|---|---|---|
| 5,068,780 | 11/1991 | Bruckert et al. | 395/700 |
| 5,155,835 | 10/1992 | Belsan | 395/425 |
| 5,195,100 | 3/1993 | Katz et al. | 371/66 |
| 5,237,658 | 8/1993 | Walker et al. | 395/200 |
| 5,269,022 | 12/1993 | Shinjo et al. | 395/700 |
| 5,278,838 | 1/1994 | Ng et al. | 371/10.1 |
| 5,287,462 | 2/1994 | Jibbe et al. | 395/275 |
| 5,289,418 | 2/1994 | Youngerth | 365/201 |
| 5,297,258 | 3/1994 | Hale et al. | 395/275 |
| 5,317,752 | 5/1994 | Jewett et al. | 395/750 |

Primary Examiner—Kevin A. Kriess
Attorney, Agent, or Firm—Lane R. Simmons

[57] ABSTRACT

Boot firmware is manipulated within separately erasable/writable blocks of a flash EEPROM, and a non-volatile memory bit circuit is used to force manipulation of address space associated with the blocks to provide a powerfail durable flash upgrade for the EEPROM without the need for a separate ROM. During a firmware upgrade in the EEPROM, a block in the EEPROM is erased, other than the primary boot block, and is designated as an alternate boot block. The primary boot block firmware contents are then copied to the alternate boot block, and the non-volatile memory bit is set to cause the alternate boot block to appear in the address space of the primary boot block from a microprocessor's perspective. The primary boot block is then erased and written with new firmware information. The non-volatile memory bit is then reset back to allow the primary boot block to appear in its proper address space, and the alternate boot block is upgraded with its new firmware information. This system and method provides for the retaining of primary boot block firmware in an EEPROM during an upgrade so that if a powerfail occurs during the upgrade, the primary boot block information is still available in the EEPROM, thus eliminating the need for a separate ROM which would normally contain primary boot block information in the event of a powerfail.

16 Claims, 4 Drawing Sheets

FIG. 3

| HEX | 0 | 0 | 0 | 0 | 0 | 0 | 0 | 0 |
|---|---|---|---|---|---|---|---|---|
| BINARY | 0000 | 0000 | 0000 | 0000 | 0000 | 0000 | 0000 | 0000 |
| BIT # | 31 30 29 28 | 27 26 25 24 | 23 22 21 20 | 19 18 17 16 | 15 14 13 12 | 11 10 9 8 | 7 6 5 4 | 3 2 1 0 |

← 95

| HEX | 0 | 0 | 0 | 0 | 8 | 0 | 0 | 0 |
|---|---|---|---|---|---|---|---|---|
| BINARY | 0000 | 0000 | 0000 | 1000 | 0000 | 0000 | 0000 | 0000 |
| BIT # | 31 30 29 28 | 27 26 25 24 | 23 22 21 20 | 19 18 17 16 | 15 14 13 12 | 11 10 9 8 | 7 6 5 4 | 3 2 1 0 |

← 100

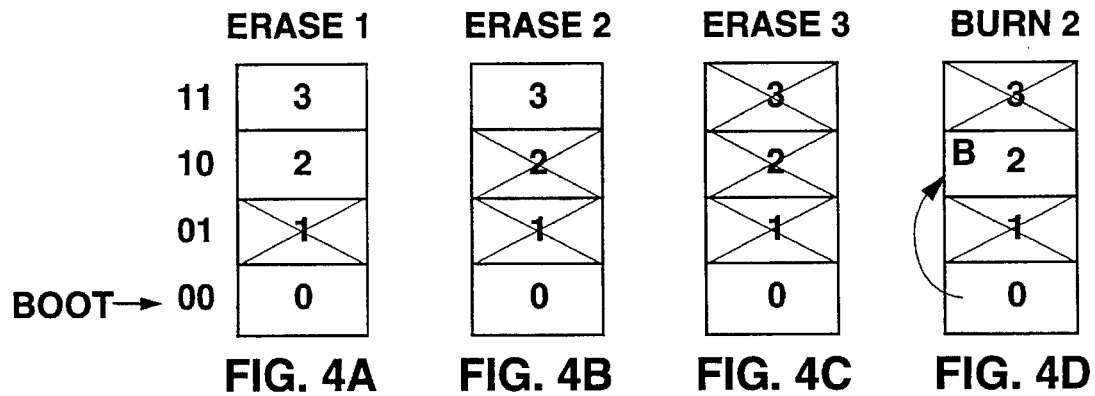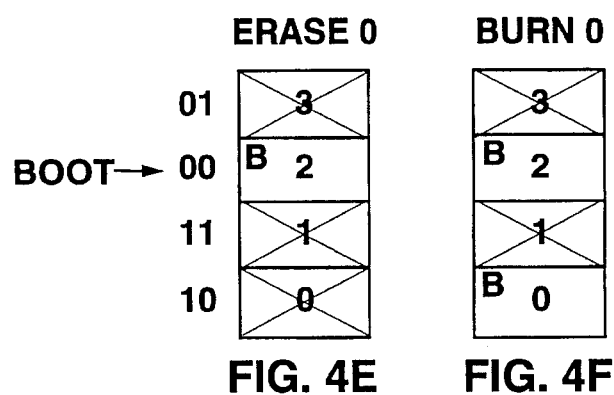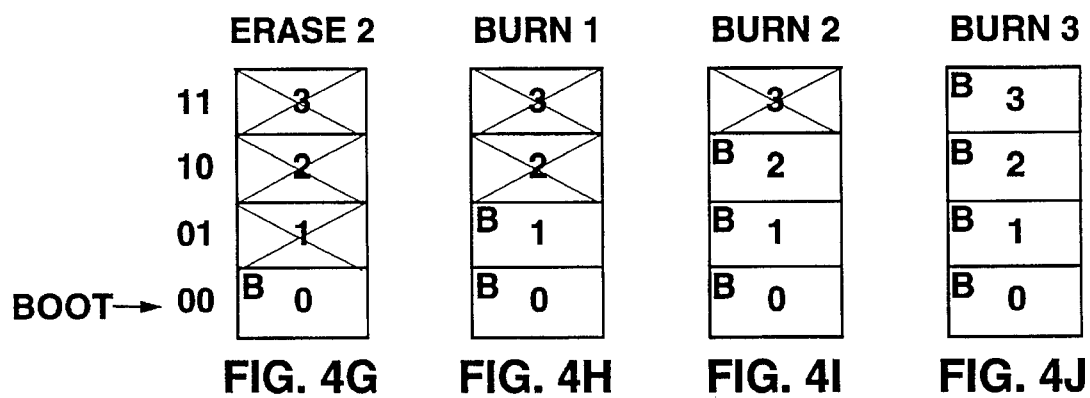

POWERFAIL DURABLE FLASH EEPROM UPGRADE

FIELD OF THE INVENTION

This invention relates, in general, to semiconductor devices and, more particularly, to upgrading firmware in a flash electrically erasable programmable read only memory (EEPROM).

BACKGROUND OF THE INVENTION

Memory devices and microprocessors are key elements in computer technology. Specifically, when power is initially supplied to a computer system, a microprocessor is one component that receives power and, in response, looks to a specified memory address in a non-volatile memory device for preliminary instructions to execute and thereby become functionally operational. This process is commonly known as a "boot up" process. Namely, the microprocessor "boots up" from a non functional mode to an operational mode upon power initialization by reading and executing basic, essential instructions (firmware) stored in a non-volatile memory device.

An electrically erasable programmable read only memory (EEPROM) device is a non-volatile memory commonly used for storing firmware (code) to boot up a microprocessor. A flash EEPROM allows for its entire memory to be erased in a single step. In recent years, flash EEPROMs having selectively erasable/writable block capabilities have become widely available allowing for address specific blocks in the EEPROM to be selectively erased and/or written.

The flash EEPROM has been especially useful in computer systems because firmware can be erased and upgraded upon demand without the need for physically replacing an entire memory chip, such as a read only memory (ROM). Being able to upgrade firmware by downloading the code to the EEPROM not only simplifies and reduces the cost of firmware upgrades (i.e., no need to replace the entire chip), but it also increases the reliability of the product which embodies the EEPROM because no sockets are needed for chip replacement.

However, during a firmware upgrade process, the product is vulnerable to disruptions during the period when the flash EEPROM is erased. Namely, if the boot firmware is erased in preparation for the writing of new firmware (the upgrade), and a power failure or other disruption occurs at that instant in time, then the upgrade process can not be completed and the product is left essentially useless, i.e., without the original firmware and without the upgraded firmware. Once the boot firmware is erased, the system (microprocessor) no longer has access to instructions for boot up execution, let alone to execute any other action such as downloading new firmware.

Current products on the market deal with the problem of potential powerfail during a firmware upgrade in one of several ways. For example, an additional boot ROM may be used to hold a minimum set of code needed to get the product ready for a flash EEPROM upgrade. However, this adds expense and software complexities to the product. Additionally, the boot ROM often has to be physically upgraded along with the firmware upgrade of the EEPROM due to requirements placed on it by most microprocessor architectures.

An alternate method for dealing with disruptions during an EEPROM upgrade is simply to warn the user that if such occurs, the product will need to be returned to the factory for repair.

It is obvious that these solutions leave much to be desired. Accordingly, objects of the present invention are to provide a system and method for providing powerfail durable flash EEPROM upgrades without the need for an extra boot ROM.

SUMMARY OF THE INVENTION

According to principles of the present invention in its preferred embodiment, system (microprocessor) boot firmware is manipulated within separately erasable/writable blocks of a flash EEPROM, and a non-volatile memory bit circuit is used to force manipulation of boot address space associated with the blocks to provide a powerfail durable flash upgrade for the EEPROM without the need for a separate boot ROM. In the preferred embodiment, the memory bit circuit is a flip flop.

During a firmware upgrade in the EEPROM, a block in the EEPROM is erased, other than the primary boot block, and is designated as an alternate boot block. The primary boot block firmware is then copied to the alternate boot block, and the non-volatile memory bit circuit is set to cause the alternate boot block to appear in the address space of the primary boot block from the microprocessor's perspective. The primary boot block is then erased and burned with new firmware information. The memory bit circuit is then reset back to allow the primary boot block to appear back in its proper address space, and the alternate boot block is upgraded with its new firmware information.

This system and method provides for the retention of primary boot firmware in an EEPROM during an upgrade so that if a powerfail occurs during the upgrade, the primary boot information is still available in the EEPROM. This eliminates the need for a separate boot ROM which would normally contain primary boot information in the event of a powerfail.

Other objects, advantages, and capabilities of the present invention will become more apparent as the description proceeds.

DESCRIPTION OF THE DRAWINGS

FIG. 3 is a table depicting how an upper bit is inverted to cause an alternate boot block to appear in the address space of the primary boot block.

FIGS. 4A–J are block diagrams depicting the various stages of boot block and memory address manipulations during a firmware upgrade.

DETAILED DESCRIPTION OF THE INVENTION

Figure 1B:
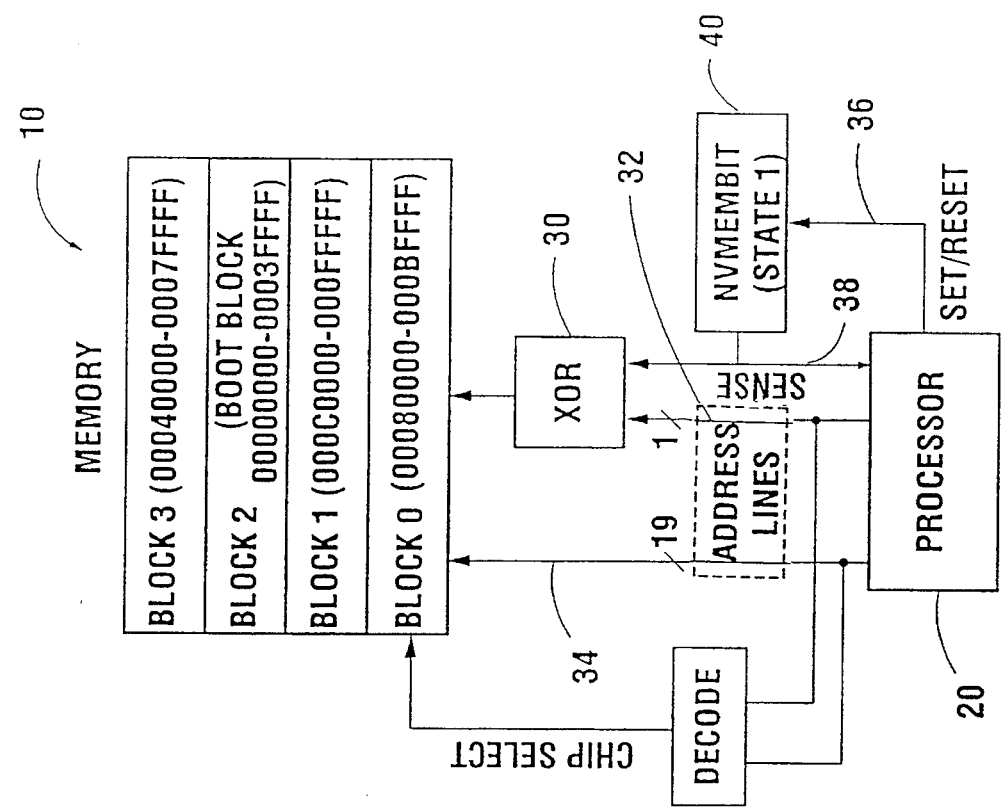
FIG. 1B is a block diagram depicting memory addressing for a system boot from an alternate boot block based on a second state signal from a nonvolatile memory bit circuit.
Figure 1A:
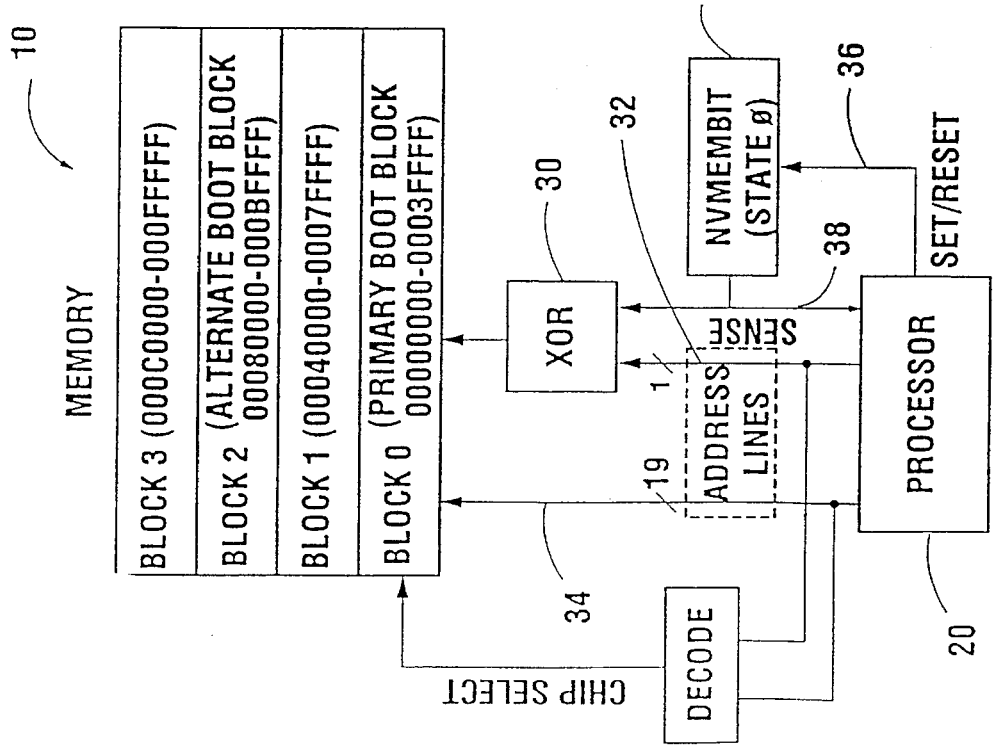
FIG. 1A is a block diagram depicting memory addressing for a system boot from a primary boot block based on a first state signal from a non-volatile memory bit circuit.

FIGS. 1A–B are system block diagrams depicting boot block memory address manipulation based on the state of a non-volatile memory bit circuit according to the present invention. FIG. 1A shows normal memory addressing for system boot up from the primary boot block, and FIG. 1 B shows relative memory addressing for boot up from the alternate boot block. Similar components in all Figures are identified with similar reference numbers.

In reference to FIG. 1 A, first memory 10 is a non-volatile, flash electrically erasable programmable read only memory (EEPROM) having separately erasable/writable blocks 0–3. Each block comprises 256 K bytes of addressable memory. Although in this depiction memory 10 includes 4 blocks of 256 K bytes each, it is understood that other sized blocks of memory are equally usable under principles of the present invention. In general, EEPROMs do not contain blocks of equal size. However, the blocks can usually be combined in a form that allows for the appearance of two or more logical blocks of equal size. For example, Block 0 may actually be further subdivided into separately distinguishable and different sized blocks. On the other hand, memory 10 as a whole may be subdivided into fewer or greater blocks overall. However, regardless of the physical size and makeup of memory 10, for this invention it is only required that it have at least two separately erasable/writable blocks.

Although in the preferred embodiment memory 10 is a single EEPROM device having multiple, selectively erasable/writable blocks, memory 10 could equally be a bank of separately addressable EEPROM devices wherein each device may or may not have selectively erasable/writable blocks. As such, each separate device would act as a separately erasable/writable block in the described memory 10. Similarly, memory 10 could equally be a random access memory (RAM) made non-volatile (NVRAM) by some form of power supply backup. In the case where NVRAM is used, the step of erasing a block of data may occur in the same step as writing data to the memory where such occurs.

Block 0 is the primary boot block for microprocessor (processor) system 20, and is addressable at a primary address space. Primary boot block means that processor 20 looks to the primary address range associated with block 0 upon power up or initialization for primary boot firmware execution. The primary boot block must contain the subset of firmware functionality required to bring the processor to an operational state sufficient to perform an upgrade.

Block 2 is the alternate boot block and is addressable at an alternate address space. Block 2 is identified as the alternate boot block because under principles of the present invention, the boot firmware that generally resides in the primary boot block is copied to this alternate boot block during an upgrade of the firmware in order to provide a powerfail durable upgrade. Block 2 normally does not contain boot firmware, but usually contains other firmware necessary for the functional purposes of processor 20.

Similar to the normal (non upgrade) status of block 2, blocks 1 and 3 contain firmware necessary for the functional purposes of the processor. For this example, the address range 00000000–000FFFFF will be used to describe blocks 0–3. Also in this example, processor 20 looks for its primary boot information starting at address zero. However, this invention could easily be adapted to processor architectures that look for initial boot instructions in other memory locations.

Logic circuitry XOR 30 is a two input Exclusive OR gate. One input is driven by an address bit 32 and the other input is driven by non-volatile memory bit circuit 40. The XOR gate provides the ability to either invert or not invert address bits as needed. There is one XOR gate on each address line that needs to be inverted. In this preferred embodiment, only the most significant address bit line 32 has an XOR gate. The other address bit lines 34 communicate between processor 20 and memory 10 in a normal manner for addressing memory 10.

Non-volatile memory bit circuit 40 (referred to herein as nvmembit) is a single bit signal, non-volatile memory circuit, such as a flip flop, capable of being set and/or reset. In this depiction, nvmembit 40 is reset to a first (logical zero) state. The first state is represented as logical zero, but it could equally be logical 1 if so chosen. In this state the input of the XOR gate driven by nvmembit 40 is set such that address bit 32 is not inverted.

While nvmembit 40 is in the first state, processor 20 accesses memory normally. Namely, block 0 is referenced with the primary address space as the primary boot block and the boot firmware is executed from there upon initialization of processor 20.

Processor. 20 is capable of setting and/or resetting nvmembit 40 as shown at 36, and is also capable of sensing the state of nvmembit 40 as shown at 38. Processor 20 is capable of these functions so that it can determine the status of a firmware upgrade and whether the upgrade was disrupted or not. Namely, during an upgrade the processor executes code necessary for setting and/or resetting nvmembit 40 to an appropriate state. Similarly, processor 20 senses the state of nvmembit 40 to determine how to progress with subsequent upgrades, i.e., if a disruption did or did not occur during a previous upgrade. As such, the processor determines whether it is looking at the primary or alternate boot blocks of memory 10.

Referring now to FIG. 1B, nvmembit 40 is shown in a second (logical 1) state, and memory 10 is shown having block 2 associated with the primary boot address space for boot purposes, rather than block 0. As such, block 2 is now addressable with primary address 00000000–0003FFFF hex for boot purposes (from processor 20's perspective), and block 0 is addressable with alternate address 00080000–000BFFFF hex.

Although the blocks do not actually physically move relative to each other, and although the true address spaces associated with each block do not actually change, the address spaces are shown as having "changed" to represent the idea that from processor 20's perspective, the primary address space for executing boot instructions is now associated with the firmware contents of block 2 rather than block 0 (although in reality processor 20 doesn't actually recognize or differentiate one block from another).

This address "manipulation" has occurred because nvmembit 40 is set in its second (logical 1) state and causes XOR gate 30 to invert address line 32. In essence, nvmembit 40 causes the alternate boot block 2 to appear in the primary address space from the microprocessor's perspective, and the primary boot block to appear in the alternate address space. As such, during a firmware upgrade process and in case of a disruptive event, the firmware data remains boot addressable by processor 20 in the alternate boot block.

Obviously, the firmware must include relative addressing for execution from either the primary or alternate boot block. Also, processor 20 senses the state of nvmembit 40 so that it knows it is looking at the alternate boot block rather than the primary boot block for execution of appropriate code during boot after a disruptive event has occurred. Furthermore, at any given power up, processor 20 determines which blocks have complete and valid firmware through checksums built across and stored in each block. Thus, the progress of any given upgrade is detectable.

Figure 2:
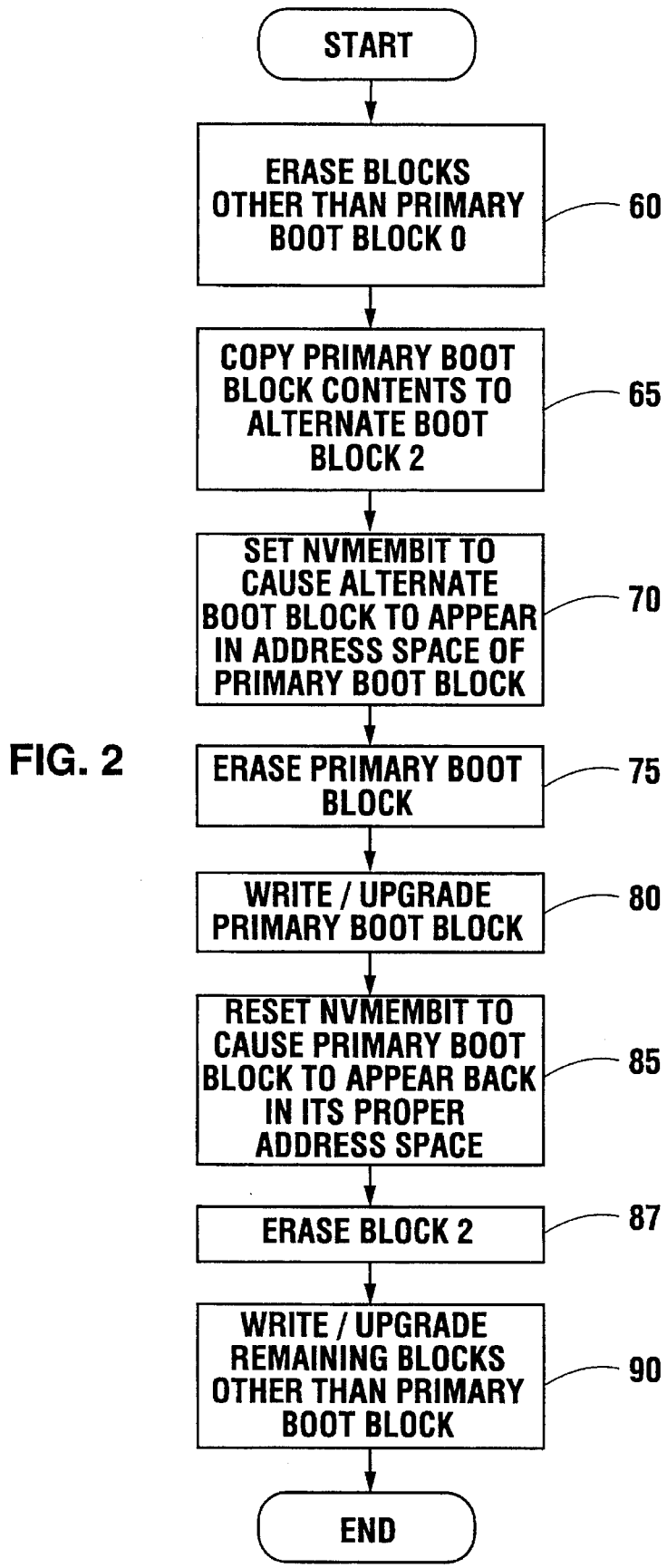
FIG. 2 is a flow chart depicting the steps followed for boot block and memory address space manipulations during a firmware upgrade.

Referring now to FIG. 2, a flow chart depicts the steps followed for manipulating boot block and memory address space for a powerfail durable firmware upgrade. First, 60, all blocks of memory 10 (FIG. 1) are erased other than primary boot block 0. As is commonly known in the art, during the upgrade process boot firmware may need to be copied out of the primary boot block and into processor memory for execution. This is due to the erase and write characteristics of the EEPROM.

Next, 65, primary boot block 0 firmware is copied to alternate boot block 2 and nvmembit 40 is set to its second (logical 1) state 70. Setting nvmembit 40 to its second state causes alternate boot block 2 to appear in the primary address space of boot block 0 from the processor's perspective. This apparent manipulation of address space is caused by nvmembit 40 setting one input of XOR gate 30 to one, consequently inverting the upper address bit for all address requests received from processor 20 for accessing the primary address space.

FIG. 3 is a table depicting how an upper address bit is inverted to cause the alternate boot block to appear in the address space of the primary boot block from the microprocessor's perspective. In this case, bit number 19 is inverted. Consequently, although processor 20 thinks it is addressing the primary boot block starting address of 00000000 hex shown at 95, XOR gate 30 causes bit number 19 to invert and thereby causes processor 20 to access the alternate boot block starting address of 00080000 hex shown at 100.

Returning again to FIG. 2, after the nvmembit is set 70, the primary boot block 0 is erased 75. After the primary boot block is erased, if a disruptive event or powerfail were to occur, the upgrade could not be completed if block 2 were not addressable as an alternate boot block by processor 20. However, this invention allows processor 20 to access block 2 as an alternate boot block. Specifically, if power were lost without the upgrade being completed, and processor 20 were to be reinitialized, nvmembit 40 would remain in its second (logical 1) state. Accordingly, XOR gate 30 would invert the upper address bit (see FIG. 3) so that the alternate boot block address space would be accessed by processor 20 rather than the primary boot block address space. As such, processor 20 boots from the alternate boot block without ever really knowing any difference.

After the primary boot block 0 is erased 75, it is subsequently upgraded (burned and/or written to) with new boot firmware 80. Upon completion of the upgrade of the primary boot block, nvmembit 40 is reset 85 to its first (logical 0) state to cause the primary boot block to appear back in its proper address space. At this stage, should a powerfail occur, the new boot information is already retained in block 0 and would be used by the processor on boot up because nvmembit 40 is reset to its first state.

Finally, 87, the boot firmware in block 2 is erased and all blocks (other than the primary boot block) are upgraded 90 with any new firmware information to complete the upgrade process.

Referring now to FIGS. 4A–J, simplified block diagrams depict the various stages of boot block and memory address manipulations during a powerfail durable firmware upgrade of the present invention. FIGS. 4A–D show block 0 as the primary boot block and that a processor boot will occur from block 0 (when nvmembit 40 of FIG. 1 is set to its logical 0 state). FIGS. 4A–C show the first steps of erasing all blocks other than the primary boot block in preparation for a firmware upgrade (see also 60, FIG. 2). Erased blocks are shown by an "X" through the block.

FIG. 4D shows the next step of copying the contents of the primary boot block 0 to the alternate boot block 2 (see also 65, FIG. 2). A block having data written to it (burned in it) is shown with the letter "B" in the upper corner.

FIGS. 4E–F show alternate block 2 now as the block from which a processor will boot (see also 70, FIG. 2). As previously described, this is due to nvmembit 40 being set to cause XOR gate 30 to invert an upper address bit to cause the alternate boot block to appear in the primary address space from the processor's perspective. FIG. 4E shows how block 0 is erssed in prepsration for its upgrade, and FIG. 4F shows how block 0 is upgraded (written to) with the new boot firmware (see also 75 and 80, FIG. 2).

FIGS. 4G–J show block 0 being addressed again as the block from which a processor boot will occur. This is due to nvmembit 40 being reset (see 85, FIG. 2) to cause the primary boot block 0 to appear back in its proper address space. FIG. 4G shows how block 2 is erased (see 87, FIG. 2) since it still retains a copy of the original boot firmware from the step of FIG. 4D. And finally, FIGS. H–J show how blocks 1, 2, and 3 are burned with the remaining firmware to complete the upgrade process (see 90, FIG. 2). The following pseudo code is exemplary of a preferred implementation of the previously described system and process for a powerfail durable firmware upgrade.

```
Procedure EEPROM_Burning_Upgrade_Firmware( )
    /* Note: for reasons of clarity, this pseudo code will
       not call out the changes in the address map from the
       viewpoint of the processor but will continue to refer
       to the blocks in their physical address locations. This
       code can be called from the powerup sequence or
       from the normal running system. Regardless, it will
       detect the state of the system and erase/burn the
       correct blocks.                                      */
    Set "NVRAM_ROM_State"="In Upgrade"
    If "Hardware_Boot_Pointer"="Boot Block (Primary)"
        Erase(Block 1)
        Erase(Block 2)
        Erase(Block 3)
        Burn(Block 2 with a copy of the primary "Boot
            Image" (address 00000000 - 0003FFFF))
        Checksum_Check(Block 2)
        Set "Hardware_Boot_Pointer"="Alternate Boot
            Block"
    end;
    Erase(Block 0)
    Burn(Block 0 with data from the new image (address
        0000 - 0003FFFF))
    Checksum_Check(Block 0) - if failure, reset and
        reattempt upgrade
    Reset "Hardware_Boot_Pointer"="Boot Block
        (Primary)"
    Burn(Block 1 with data from the new image (address
        00040000 - 0007FFFF))
    Checksum_Check(Block 1) - if failure, reset and
        reattempt upgrade
    Erase(Block 2)
    Burn(Block 2 with data from the new image (address
        00080000 - 000BFFFF))
    Checksum_Check(Block 2) - if failure, reset and
        reattempt upgrade
    Burn(Block 3 with data from the new image (address
        000C0000 - 000FFFFF))
    Checksum_Check(Block 3) - if failure, reset and
        reattempt upgrade
    Set "NVRAM_ROM_State"="Not in Upgrade"
end;
```

What has been described above are the preferred embodiments for a system and method for providing a powerfail durable flash upgrade for an EEPROM without the need for a separate ROM. It will be obvious to one of ordinary skill in the art that the present invention is easily implemented utilizing any of a variety of hardware and software tools existing in the art. While the present invention has been described by reference to specific embodiments, it will be obvious that other alternative embodiments and methods of implementation or modification may be employed without departing from the true spirit and scope of the invention.

What is claimed is:

1. A method for providing powerfail durable memory upgrades for a first memory device having system boot data and separately erasable/writable blocks addressable by a microprocessor, the method comprising the steps of:

(a) copying the boot data from a primary boot block associated with a primary address space in the first memory device to an alternate boot block associated with an alternate address space;

(b) setting a second non-volatile memory to cause the alternate boot block to appear in the primary address space from the microprocessor's perspective, and the primary boot block to appear in the alternate address space, and whereby in case of a disruptive event the data remains boot addressable in the alternate boot block by the microprocessor;

(c) writing new boot data to the primary boot block; and, (d) resetting the second memory to cause the primary boot block to appear back in the primary address space, and the alternate boot block to appear back in the alternate address space.

2. The method of claim 1 wherein the first memory device is selected from (i) a block electrically erasable programmable read only memory (EEPROM) device, (ii) a plurality of EEPROMs, and (iii) a non volatile random access memory (RAM).

3. The method of claim 1 wherein the boot data and the new boot data include intelligence necessary for an acquisition of firmware for booting the microprocessor, and wherein the intelligence includes relative addressing for execution from the primary and alternate boot block.

4. The method of claim 1 further including the step of erasing each block sometime prior to writing the block.

5. The method of claim 1 wherein the second memory is a non-volatile flip flop circuit.

6. The method of claim 1 wherein a state of the second non-volatile memory is sensed by:

(i) logic circuitry communicating between the microprocessor and the first memory device for manipulating addressing of the blocks of the first memory device; and, (ii) the processor for determining an upgrade status indicative of whether the upgrade was disrupted or not.

7. The method of claim 6 wherein the logic circuitry, upon sensing the state of the second non-volatile memory, inverts at least one address bit for manipulating addressing of the blocks.

8. A system for providing powerfail durable memory upgrades, comprising:

(a) a first memory bank having first and second separately erasable/writable blocks, the blocks being associated with first and second address spaces, respectively;

(b) means for copying first data from the first block to the second block;

(c) means for setting a second non-volatile memory to cause the second block to appear in the first address space from a microprocessor's perspective, and the first block to appear in the second address space, and whereby in case of a disruptive event the data remains boot addressable in the second block by the microprocessor;

(d) means for selectively writing second data to the blocks; and, (e) means for resetting the second memory to cause the first block to appear back in the first address space, and the second block to appear back in the second address space.

9. The system of claim 8 wherein the first memory bank is selected from (i) a block electrically erasable programmable read only memory (EEPROM) device, (ii) a plurality of EEPROMs, and (iii) a non-volatile random access memory (RAM).

10. The system of claim 8 wherein the first and second data include intelligence necessary for the acquisition of firmware for booting the microprocessor, and wherein the intelligence includes relative addressing for execution from the first and second blocks.

11. The system of claim 8 further including means for selectively erasing the blocks.

12. The system of claim 8 wherein the second memory is a non-volatile flip flop circuit.

13. The system of claim 8 further including logic circuitry communicating between the microprocessor, the first memory bank, and the second non-volatile memory for sensing a state of the second non-volatile memory and for manipulating addressing of the blocks of the first memory device.

14. The system of claim 13 wherein the logic circuitry inverts at least one address bit for manipulating addressing of the blocks.

15. The system of claim 8 further including means for sensing a state of the second non-volatile memory device for determining an upgrade status indicative of whether the upgrade was disrupted or not.

16. A system for providing powerfail durable firmware upgrades for a microprocessor, comprising:

(a) an EEPROM having primary and alternate separately erasable/writable blocks, the blocks being associated with primary and alternate address spaces, respectively;

(b) means associated with the microprocessor for copying boot data from the primary block to the alternate block;

(c) means associated with the microprocessor for setting a non-volatile memory bit to a first logical state indicative of an upgrade status of the EEPROM;

(d) means associated with the microprocessor for sensing the state of the non-volatile memory bit for determining whether the upgrade was disrupted or not;

(e) logic circuitry communicating between the microprocessor, the EEPROM, and the non-volatile memory bit for sensing the state of the non-volatile memory bit and for manipulating addressing of the blocks of the EEPROM to cause the alternate block to appear in the primary address space from the microprocessor's perspective, and the primary block to appear in the alternate address space, and whereby in case of a disruptive event the data remains boot addressable in the alternate block by the microprocessor;

(f) means associated with the microprocessor for selectively erasing the blocks;

(g) means associated with the microprocessor for selectively writing new data to the blocks, wherein the data includes intelligence necessary for the acquisition of firmware for booting the microprocessor; and, (h) means for resetting the non-volatile memory bit to cause the primary block to appear back in the primary address space, and the alternate block to appear back in the alternate address space.

* * * * *